United States Patent [19]
Pauley et al.

[11] Patent Number: 5,551,707
[45] Date of Patent: Sep. 3, 1996

[54] MULTI-MATERIAL SEAL RING

[75] Inventors: Douglas E. Pauley; Gary D. D'Abate, both of Gainesville; Kazushi Ishikawa; John M. Lopez, both of Cleveland, Ga.

[73] Assignee: Freudenberg-NOK General Partnership, Plymouth, Mich.

[21] Appl. No.: 469,653

[22] Filed: Jun. 6, 1995

[51] Int. Cl.⁶ ............................................. F16J 15/00
[52] U.S. Cl. ......................... 277/233; 277/227; 277/228
[58] Field of Search ................................. 277/227, 228, 277/229, 233, 125, 165

[56] References Cited

U.S. PATENT DOCUMENTS

| | | | |
|---|---|---|---|
| 2,868,575 | 1/1959 | Hawxhurst | 277/228 |
| 2,907,612 | 10/1959 | White | 277/233 |
| 2,961,713 | 11/1960 | Hartley . | |
| 3,627,337 | 12/1971 | Pippert | 277/233 |
| 3,775,832 | 12/1973 | Werra | 277/228 |
| 3,944,235 | 3/1976 | Gordon | 277/233 |
| 4,346,004 | 8/1982 | Foucras | 210/232 |
| 4,615,547 | 10/1986 | Sutcliffe et al. | 285/136 |
| 4,645,710 | 2/1987 | Baitinger et al. | 428/317.7 |
| 4,997,193 | 3/1991 | Czernik | 277/233 |
| 5,443,887 | 8/1995 | Nakao | 428/137 |

Primary Examiner—Daniel G. DePumpo
Attorney, Agent, or Firm—Dinnin & Dunn, P.C.

[57] ABSTRACT

A composite seal of the type formed of a plurality of layers which provide a suitable fluid or gas seal between two rigid parts. The seal includes a layer of plastic material sandwiched between layers of elastomeric material, wherein the plastic and elastomeric materials are of a type not subject to cross-linkage bonding between the respective materials. The multi-layer seal is formed through use of an adhesive to bond the dissimilar layers to form a permanent multi-layer member.

18 Claims, 1 Drawing Sheet

MULTI-MATERIAL SEAL RING

BACKGROUND OF THE INVENTION

1. Field of the Invention

The invention pertains to a seal ring formed of a plurality of layered materials. More particularly, the seal ring is formed as an O-ring having an intermediate layer to reduce permeation of fluids or gasses through the seal ring while retaining sealing capabilities and properties.

2. Description of the Related Art

Seals are used to seal a variety of mechanical parts. Normally, a seal is a pliable member, having some resiliency, that is placed between two rigid parts to prevent the escape or migration of a fluid or gas. One type of such a seal is an O-ring. Typically, an O-ring is a ring of elastomeric material used to seal a moving part within a housing or enclosure. One typical use for an O-ring would be in a hydraulic cylinder, wherein the O-ring seals the piston within the cylinder such that the hydraulic fluid moves the piston. Additionally, O-rings are used to seal fluid-type connections wherein fluid is being passed through one tubular member to a second tubular member or conduit.

It is known to manufacture O-rings of dissimilar materials. See for example U.S. Pat. No. 2,961,713 which discloses laminating sheets of different colored materials together and using conventional compression cavity molding techniques to form an O-ring. However, such an approach is limited in that it requires the use of common cure system material. Such materials are necessary in order to obtain cross linkage; i.e., a suitable bond between the materials used. Only common cure materials or those which will cross link with one another may be used.

While such an O-ring is suitable for some purposes, it is desirable to have an O-ring having a high resistance to permeability of certain fluids and gasses while at the same time exhibiting sufficient elastability and resiliency to provide a suitable fluid or gas seal. Obviously, many materials which are suitable for providing a proper seal may not have the necessary properties to resist permeability.

SUMMARY OF THE INVENTION

Accordingly, the present invention is a multi-material seal ring utilizing dissimilar material such that the seal minimizes the permeation of fluids and gasses through the seal ring while maintaining a suitable fluid or gas seal.

In the preferred form, the seal ring is formed of a multi-layer member including a plurality of layers. The layers are divided into a first layer of elastomeric material, a second layer of elastomeric material, and a layer of plastic material sandwiched between the first and second layers of elastomeric material. The layers are bonded to one another by an adhesive which promotes a permanent bond between the individual layers.

In accordance with the invention, the plastic layer is formed of a material impermeable to the fluid or gas being sealed, thus such a seal prevents migration or permeation of the sealed fluid or gas through the seal ting. Such a seal ring construction enables materials without a common cure system; i.e., the ability to be cross-linked, to be used in forming a multi-layer seal ring having increased resistance to permeability while maintaining sufficient elasticity, and resiliency to form a suitable seal.

DETAILED DESCRIPTION OF THE PREFERRED EMBODIMENTS(s)

Figure 1:
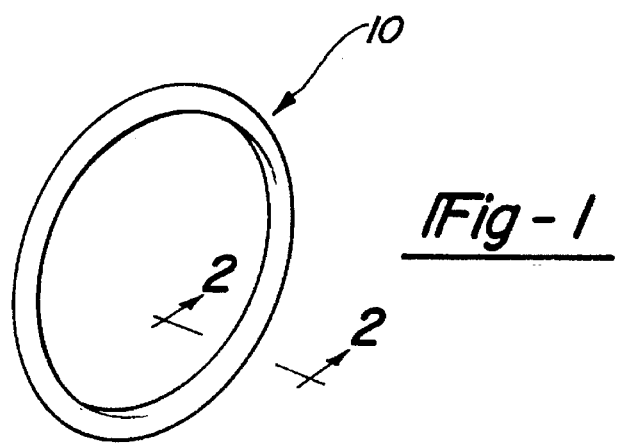
FIG. 1 is a perspective view of an O-ring seal according to the present invention.
Figure 2:
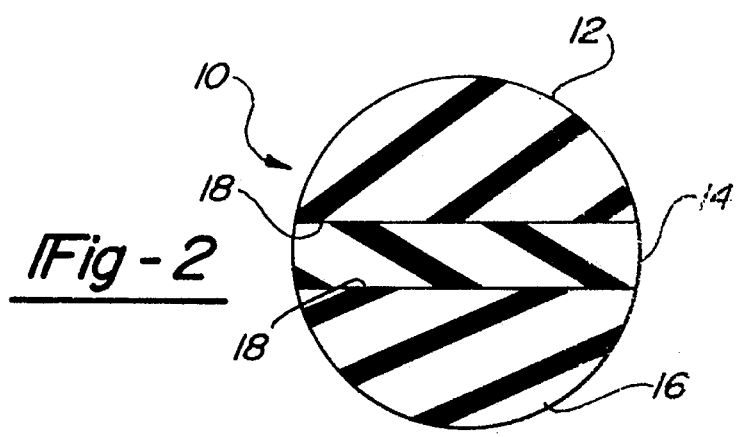
FIG. 2 is a cross-sectional view taken along lines 2—2 of FIG. 1.

Turning now to FIGS. 1 and 2, a seal ring according to the present invention is shown as an O-ring 10. While shown as an O-ring, the seal ting could also be formed of other shapes to accommodate the parts being sealed. Additionally, the cross-sections of the seal ring may be modified depending upon a particular use.

According to the invention and as shown in FIG. 2, the O-ring 10 includes a first layer 12 of an elastomeric material, a layer of plastic material 14, and a second layer of elastomeric material 16. As illustrated in FIG. 2, the plastic layer 14 is disposed between and separates the two elastomeric layers 12,16. In the preferred form, the elastomeric layers 12,16 sandwich the plastic layer 14 between them and each elastomeric layer 12, 16 is bonded to the plastic layer 14 by a suitable adhesive 18. While shown in FIG. 2 as a relatively thick layer; i.e., the width of the plastic layer 14 is substantial when compared to the overall width or diameter of the O-ring 10, the plastic layer 14 may also be quite thin, for example, a plastic film. Thus, one application would be to sandwich a plastic film between the two elastomeric layers 12, 16.

The plastic layer 14 is normally formed of a material such as a fluorocarbon which exhibits high resistance to permeability. The elastomeric layers 12, 16 are formed of a fluorosilicone which typically provides an excellent seal material in that it maintains excellent sealing properties over a wide range of temperatures. Thus, the O-ring 10 provides sealing capabilities coupled with a high resistance to penetration or permeation of fluids through the elastomeric body of the O-ring 10.

Such dissimilar materials as fluorosilicone and fluorocarbons are not suitable for compression molding due to the fact that the materials exhibit no cross-linkage capabilities. Therefore, it is necessary to form the O-ring 10 through use of a suitable adhesive 18 placed at the interface of the dissimilar material, in this case the fluorosilicone elastomeric layer 12,16 and the fluorocarbon plastic layer 14. It has been determined that a suitable adhesive 18 which provides a permanent bond between the two materials is an ethylene vinyl alcohol adhesive. It should be appreciated that the adhesive 18 used will vary depending upon the type of material sought to be bonded. Thus, various materials can be chosen based on the necessary sealing properties and permeation rates depending upon the fluid or gas to be sealed.

Figure 2A:
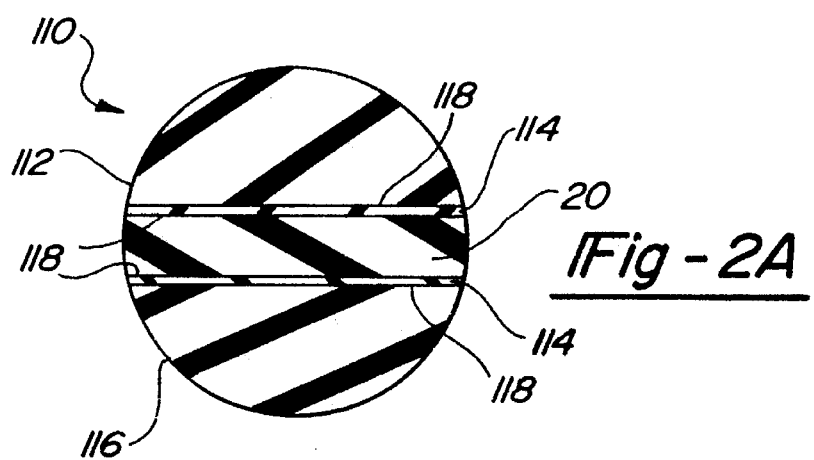
FIG. 2a is a cross-sectional view taken along lines 2—2 of an alternative embodiment according to the present invention.

Turning now to FIG. 2a, an alternative embodiment showing a multi-material seal ring according to the present invention is shown. Like parts have like reference numerals increased by a value of 100. Once again, FIG. 2a illustrates a cross-sectional view of an O-ring-type seal. The O-ring 110 includes a first elastomeric layer 112, a plastic layer 114, a second elastomeric layer 116, a second plastic layer 114, and a third elastomeric layer 20. As set forth previously, the elastomeric layers 112, 20, 116 are made from materials dissimilar from those used in the plastic layers 114. FIG. 2a illustrates an embodiment wherein the middle elastomeric layer 20 may be made from a material differing from that used for the two outer elastomeric layers 112,116. Differences may include variations in the durometer of the elastomer, to cope with thermal expansion characteristics when the seal is in use. As set forth above, a suitable adhesive 118 is used at the interfaces of the dissimilar materials to provide a permanent bond at each interface.

An additional advantage of the present invention is that it is possible to alter the stretch or thermal expansion characteristics of the elastomeric layers 12,16. Such alteration is accomplished by the lower or reduced elongation characteristics of the plastic layer 14.

While only certain embodiments of the present invention have been described, it will be apparent that with regard to the present invention, in light of the disclosure set forth above, various changes and modifications may be made without departing from the spirit and scope of the invention.

What is claimed is:

1. A composite seal ring comprising:
   a multi-layer member including the following layers:
   a first elastomeric silicone layer;
   a thermoplastic elastomeric layer;
   a second elastomeric silicone layer, said plastic layer sandwiched between said first and second elastomeric layers wherein said first and second elastomeric layers and said plastic material are formed of a material free of cross-linkage bonding and;
   an adhesive, said adhesive positioned between said elastomeric silicone layers and said thermoplastic elastomeric layer to form a permanent bond between said layers resulting in said multi-layer member.

2. A composite seal ring as set forth in claim 1 wherein said first elastomeric silicone layer is formed of a material different in composition than said second elastomeric silicone layer.

3. A composite seal ring as set forth in claim 1 wherein said thermoplastic elastomeric layer has a permeation rate lower than a permeation rate of at least one of said elastomeric silicone layers.

4. A composite seal ring as set forth in claim 1 wherein one of said elastomeric silicone layers is formed of a fluorosilicone material.

5. A composite seal ring as set forth in claim 1 wherein said thermoplastic elastomeric layer is formed of a fluorocarbon material.

6. A composite seal ring as set forth in claim 1 wherein said first and second elastomeric silicone layers are formed of a fluorosilicone material and said thermoplastic elastomeric layer material is formed of a fluorocarbon material.

7. A composite seal ring as set forth in claim 1 wherein said adhesive comprises an ethylene vinyl alcohol.

8. A composite seal ring comprising:
   a multi-layer ring member including the following components:
   a first layer of a fluorosilicone material;
   a layer of a fluorocarbon material; and
   a second layer of a fluorosilicone material, said multi-layer ring member including an adhesive positioned between the first layer of fluorosilicone material and the layer of fluorocarbon material and said adhesive further placed between the second layer of fluorosilicone material and the layer of fluorocarbon material to facilitate a bond between the adjacent layers of material to form said multi-layer ring member.

9. A composite seal ring as set forth in claim 8 wherein said adhesive material comprises an ethylene vinyl alcohol-type adhesive.

10. A composite seal ring as set forth in claim 8 wherein said layer of fluorocarbon material has a permeability rate, with respect to a fluid or gas being sealed, lower than a permeability rate of one of said layers of fluorosilicone material.

11. A composite seal ring according to claim 8 wherein said second layer of fluorosilicone material differs in overall composition from said first layer of fluorosilicone material.

12. A composite seal ring comprising:
    a multi-layer ring member including the following components:
    a first elastomeric silicone layer;
    a first thermoplastic elastomeric layer;
    a second elastomeric silicone layer;
    a second thermoplastic elastomeric layer; and
    a third elastomeric silicone layer, the thermoplastic elastomeric layers disposed between and sandwiched by the elastomeric silicone layers;
    said elastomeric silicone layers and said thermoplastic elastomeric layers formed of materials which are free of cross-linkage bonding between one another; and
    an adhesive material placed between and bonding the respective elastomeric silicone layers and thermoplastic elastomeric layers to form said multi-layer member.

13. A composite seal ring as set forth in claim 12 wherein a different elastomeric silicone material is used for at least one of said elastomeric silicone layers.

14. A composite seal ring as set forth in claim 12 wherein each of said elastomeric silicone layers is made of a different material.

15. A composite seal ring as set forth in claim 12 wherein at least one of said first, second or third elastomeric silicone layers is formed of a fluorosilicone material.

16. A composite seal ring as set forth in claim 12 wherein at least one of said thermoplastic elastomeric layers is formed of a fluorocarbon material.

17. A composite seal ring as set forth in claim 12 wherein at least one of said elastomeric silicone layers is formed of a fluorosilicone material and at least one of said thermoplastic elastomeric layers is formed of a fluorocarbon material.

18. A composite seal ring as set forth in claim 12 wherein said adhesive is an ethylene vinyl alcohol type.

\* \* \* \* \*

UNITED STATES PATENT AND TRADEMARK OFFICE
CERTIFICATE OF CORRECTION

PATENT NO. : 5,551,707
DATED : September 3, 1996
INVENTOR(S) : Douglas E. Pauley, Gary D. D'Abate, Kazushi Ishikawa and John M. Lopez It is certified that error appears in the above-indentified patent and that said Letters Patent is hereby corrected as shown below:

Column 1, Line 62, "ting" should read -- ring --.

Column 2, Line 29, delete the space before ",".

Column 2, Line 45, "fluorosilicone" should read -- fluorosilicones --.

Signed and Sealed this

Twenty-ninth Day of April, 1997

Attest:

BRUCE LEHMAN

Attesting Officer

Commissioner of Patents and Trademarks